A. B. WALTON.
WATER LEVEL INDICATING SYSTEM.
APPLICATION FILED OCT. 21, 1909.
1,049,952. Patented Jan. 7, 1913.
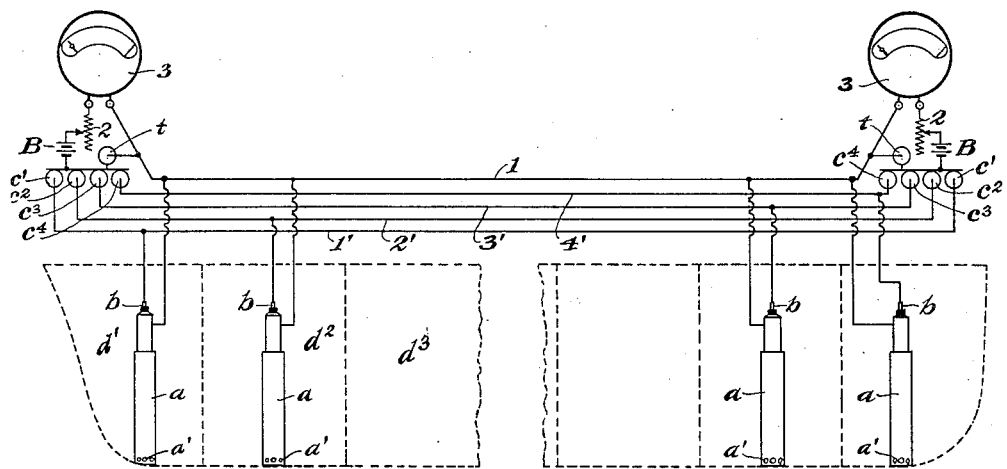
Fig. I
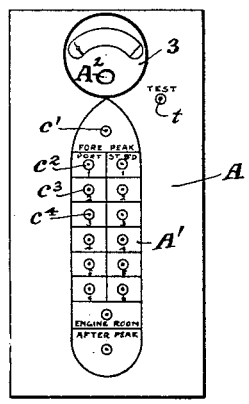
Fig. II
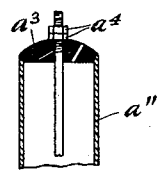
Fig. III
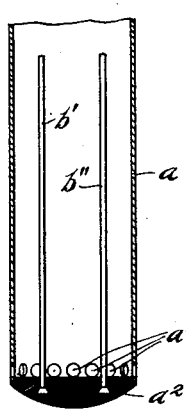
Fig. IV    Fig. V
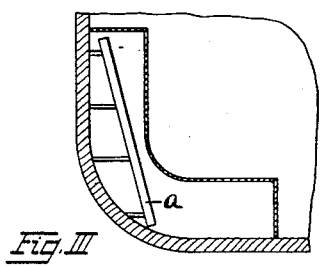
Witnesses:
H. C. Valentine
V. G. Armstrong
Inventor:
Allyn B. Walton,
by Albert [illegible] Lawrence,
his attorney.

UNITED STATES PATENT OFFICE.

ALLYN B. WALTON, OF LORAIN, OHIO.

WATER-LEVEL-INDICATING SYSTEM.

1,049,952.  Specification of Letters Patent.  Patented Jan. 7, 1913.

Application filed October 21, 1909. Serial No. 523,817.

*To all whom it may concern:*

Be it known that I, ALLYN B. WALTON, a citizen of the United States of America, and a resident of the city of Lorain, county of Lorain, and State of Ohio, have invented certain new and useful Improvements in Water-Level-Indicating Systems, of which the following is a specification.

My invention relates to improvements in water level indicating system, and has for its object the provision of means for directly indicating at a distance, the varying levels in the water ballast tanks of the bilge of steamships.

Although I am aware that a number of electrical and mechanical indicators have previously been devised, it is well known that the ordinary sounding rod or line is still resorted to, because of certain complications and features of unreliability in all previous devices with which I am acquainted. Thus, a system depending upon the use of a float, or of unsubstantial apparatus which may be subjected to the violent action of the water in the tank or bilge, will be found under ordinary sailing conditions to be inadequate and unreliable, even though well adapted for service upon shore.

Accordingly, my purpose has been to provide thoroughly practical means for equipping a vessel, so that the readings or measurements may be positively obtained under all conditions, and may be simultaneously secured in the wheel house, engine-room, the captain's room, or in other places about the vessel, as required.

Referring first in a preliminary way to the apparatus and system of my invention, I may state that within the several water ballast compartments or within the bilge of the vessel, are provided suitable inclosing pipes forming one electrode of the electric circuit, and perforated from below to admit the water, while within said pipes are respectively maintained the opposite electrode in the form of a rod or conductive wire, preferably extending centrally from the top to the bottom of said pipes, and electrically insulated therefrom. Connected therewith in multiple relation, is a suitable source of electrical energy, and at the points where the readings are to be made there are positioned for connecting in circuit therewith, suitably calibrated electrical measuring apparatus and switches or contact mechanism for establishing circuit with the respective liquid measuring appliances of the tanks. Suitable means are provided for readjusting the apparatus from time to time; the details of all the foregoing being more fully explained in connection with the accompanying drawings, wherein:—

Figure I is a diagram illustrating my system as applied to four compartments of a steamship, for indicating the water levels at two different points. Fig. II illustrates the preferred form of switching or contact-making mechanism, in association with the calibrated measuring instrument. Fig. III is a somewhat diagrammatic view, illustrating the preferred form of electrode positioned within the water-containing compartment of a vessel, shown in cross-section. Fig. IV is a detail view showing one of the pipe electrodes with the insulated conductor therein; said view showing the parts in vertical section and centrally broken away. Fig. V is a detail showing the inclosing pipe with two paired electrodes, respectively adapted for connection with the opposite poles of the battery.

Throughout the several figures of the drawings, I have employed the same reference characters to indicate similar parts.

Certain structural details in the drawings will first be explained, and then by the aid of diagrams, the complete system of my invention will be more readily understood. Since the apparatus of my invention must be subjected to severe working conditions, I have sought first to equip the vessel so that the simplest apparatus, suitably protected may be used, and its operation will not be interfered with by the pitching or rolling of the vessel, and the movement of the water within the several compartments. Accordingly, one of each pair of electrodes preferably is in the form of a pipe suitably perforated or open at the bottom to permit the passage of the water; said pipe being mounted directly upon the hull or bulkhead, and protecting the other electrode, which preferably takes the form of a small rod or conductive wire, or, if desired, the inclosing pipe may be employed for protection alone, and two parallel electrodes therein may be utilized to furnish the desired readings. Connected with each of said electrodes, are circuit wires leading to suitably calibrated indicating apparatus and switching mechanism for connecting any of said electrodes with a source of electric current or currents.

Accordingly, the indicating apparatus may be duplicated and placed in the various positions of the vessel, as required. Primarily, these positions are in the wheel house and in the engine room, so that the pumps controlling the water in the various tanks may be under the intelligent supervision of the commanding officer and chief engineer. The importance of this cannot well be over estimated, to vessels equipped with water ballast compartments adapted for trimming the steamship under conditions of shifting cargo, rapid loading, or varying weather conditions.

In said drawings, the pipes $a$ provided with openings $a'$ near their bases, are electrically connected with the common return conductor 1. Associated with said conductor fore and aft is an adjustable resistance 2, a suitable source of current B, and a meter 3, suitably calibrated to show the readings in feet and inches preferably. Conductors $1'$, $2'$, $3'$ and $4'$ respectively extend from the central electrodes $b$ of the measuring apparatus to corresponding switch apparatus or push buttons $c'$, $c^2$, $c^3$, and $c^4$ preferably situated upon the diagram board A, Fig. II. Thus the circuit through the measuring instrument 3 is adapted to be closed through any one of said compartments and the associated measuring instrument either fore or aft.

It will be observed that upon the diagram board is shown in plan view $A'$, the relation of the several tanks or water containing compartments upon the vessel, so that the engineer or officer by pressing the corresponding button, may at once read in feet and inches upon instrument 3, the depth of water in any compartment. An additional push-button $t$ is provided for testing the battery, so that the resistance 2 may be adjusted, as by turning the rotatable finger piece $A^2$, as in an ordinary rheostat.

No improvement contained in the device, shown in Fig. II, is sought to be claimed in the present application, but certain features thereof, together with other additional improvements, are reserved for patenting, and claimed in my co-pending application, Ser. No. 533,947, filed December 18, 1909.

As indicated in the drawings, the electrodes for effecting the measurement, comprise a conductive wire $b$, or a small rod secured within the recessed insulating block $a^2$ at the base of the pipe $a$; said wire or rod being attached at its upper end to another insulating block $a^3$ at the top of said pipe, where co-acting adjusting nuts $a^4$ are provided for drawing the wire taut. At intervals along the wire there may be provided insulators $b^2$ for maintaining the wire out of electrical contact with the pipe. These electrodes $b$ may have a fixed resistance throughout the system, or, as I shall explain, a copper wire or rod of negligible resistance may be employed. The latter construction is practicable and desirable, since it will be remembered that the negative electrode, or the interior of the pipe, upon the passage of current, will be partially insulated with a film of hydrogen decomposed from the water, and the resistance between the electrodes will be reduced proportionately as the water increases in height within the pipe.

As indicated in the drawing; the lower portion $a$ of the pipe may be of greater diameter than the upper portion $a''$, since the readings in the lower portion are of most importance, and this portion should be more accurately calibrated. Moreover, two flattened rods or metallic strips $b'$ $b''$ may be insulatingly mounted within the pipe $a$, and serve instead as the electrodes for effecting the measurement of the water level. Inasmuch as the pipes are open at the bottom for the free flow of water and have an air vent at the top to assist this function, it will be seen that the bottoms of the pipes will be washed free from sediment, which might otherwise accumulate and interfere with the readings between fixed electrodes positioned directly within the compartment. The protected electrodes, of course, will not be thus interfered with, nor are they liable to damage by reason of articles floating on the top of the water within the compartment.

From the foregoing, it will now be seen that the height of water in any of the various compartments $d'$ $d^2$, etc., may be indicated upon either of the instruments 3, positioned forward and aft upon the diagram of the vessel, by reason of their respective connection with the switching or contact-making appliances associated with, and likewise positioned thereon. Thus, the engineer in charge will know at once, or may be directed from the wheel house, which of the compartments is to be filled or emptied, or the height of the water in any of such compartments may be directly determined; it being understood that all of the compartments are equipped with the form of electrodes electrically connected in the manner indicated by the diagram.

Inasmuch as one or both electrodes may be inclosed within a protective pipe, pursuant to my invention just disclosed, it is apparent that they are not liable to injury, and, moreover fluctuation of the water within the pipe is reduced to a minimum when the vessel is rolling and pitching. Owing to the restricted openings in the bottom of the pipe, it will be understood that the readings, particularly from the upper portion of the pipe, which is of smaller diameter, will be more accurate during rough weather, by reason of the maintenance of the average level therein than with apparatus of some other types. Accordingly, the apparatus set forth is practical, substantial and adapted to give accurate readings under all conditions.

Having now described the preferred embodiment of my invention, I claim as new, and desire to secure by Letters Patent, the following:—

1. In apparatus of the class described, the combination with a source of electric current, of an electrical indicating appliance connected in circuit therewith, a liquid-containing compartment, a plurality of electrodes positioned within the liquid-containing compartment adapted to be connected in circuit with the foregoing, and an inclosing protective member of varying diameter and open at top and bottom, substantially as set forth.

2. In apparatus of the class described, the combination with a source of electric current, of an electrical indicating appliance connected in circuit therewith, a switching appliance, a plurality of liquid-containing compartments, a plurality of adjacent electrodes positioned within the liquid-containing compartments extending substantially the height of the liquid to be measured, and an inclosing tube having restricted openings at top and bottom for protecting each of said electrodes, substantially as set forth.

3. In apparatus of the class described, the combination with a liquid-containing compartment, of a source of electric energy, an electrical measuring instrument suitably calibrated to indicate the height of the liquid, a switching appliance all connected in circuit with a pair of electrodes positioned within the liquid-containing compartment; the said electrodes comprising a pipe having restricted openings at top and bottom, and an insulated conductor therein, both extending substantially the height of the liquid to be measured, substantially as set forth.

4. In apparatus of the class described, the combination with a liquid-containing compartment, of a source of electric energy, an electrical measuring instrument suitably calibrated to indicate the height of the liquid, a switching appliance all connected in circuit with a pair of electrodes positioned within the liquid-containing compartment; the said electrodes comprising a pipe having restricted openings at top and bottom, and an insulated conductor therein, both extending substantially the height of the liquid to be measured, and associated means for correcting the reading of the measurement, substantially as set forth.

5. In a system of the class described, the combination with a plurality of paired electrodes respectively positioned in the several water-containing compartments of a vessel, of a source of electrical energy connected therewith, said water-containing compartments and a plurality of switching appliances and associated electrical measuring instruments respectively positioned at different points upon said vessel for determining the height of water in said compartments, substantially as set forth.

6. In a system of the class described, the combination with a plurality of paired electrodes protected by inclosing pipes and respectively positioned in different compartments of a vessel, of a source of electric energy connected thereto in multiple, said water-containing compartments, and a plurality of calibrated measuring instruments and associated switching appliances electrically connected therewith for indicating in different portions of the vessel the respective heights of the water in the various compartments, substantially as set forth.

7. In water-level indicating apparatus for vessels, the combination with a plurality of paired electrodes; one of each pair comprising an inclosing pipe open at the top and bottom, and containing the other electrode extending substantially the height of the liquid to be measured, of a source of electric current, and an electrical measuring appliance adapted for connection with said source of current and any pair of electrodes, substantially as set forth.

8. In water-level indicating apparatus for vessels, the combination with a plurality of separate compartments, of a plurality of paired electrodes respectively positioned therein; one of each pair comprising an inclosing tube of greater diameter in its lower portion extending the full height of the liquid to be measured and protecting the other of the paired electrodes, a source of electric current, and suitable electrical measuring apparatus adapted to be connected in circuit with the foregoing, substantially as set forth.

Executed at Cleveland, O., this 19th day of October, A. D. 1909, in the presence of two subscribing witnesses.

ALLYN B. WALTON.

Witnesses:
V. G. ARMSTRONG,
A. L. LAWRENCE.